United States Patent
Roth et al.

(10) Patent No.: US 10,719,938 B2
(45) Date of Patent: Jul. 21, 2020

(54) METHOD AND APPARATUS FOR RECOGNIZING EDGES IN A CAMERA IMAGE, AND VEHICLE

(71) Applicant: Conti Temic microelectronic GmbH, Nuremberg (DE)

(72) Inventors: Axel Roth, Ulm (DE); Dimitri Hamidi, Munich (DE); Bingxiang Cheng, Ulm (DE); Thomas Bopp, Langenau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 135 days.

(21) Appl. No.: 16/000,060

(22) Filed: Jun. 5, 2018

(65) Prior Publication Data
US 2018/0357769 A1 Dec. 13, 2018

(30) Foreign Application Priority Data
Jun. 8, 2017 (DE) .................. 10 2017 209 700

(51) Int. Cl.
| | |
|---|---|
| *G06K 9/00* | (2006.01) |
| *G06T 7/13* | (2017.01) |
| *G06K 9/46* | (2006.01) |
| *G06T 7/168* | (2017.01) |

(Continued)

(52) U.S. Cl.
CPC ............ *G06T 7/13* (2017.01); *G06K 9/00798* (2013.01); *G06K 9/4604* (2013.01); *G06T 3/4084* (2013.01); *G06T 7/11* (2017.01); *G06T 7/168* (2017.01); G06T 2207/10024 (2013.01); G06T 2207/20064 (2013.01)

(58) Field of Classification Search
CPC combination set(s) only.
See application file for complete search history.

(56) References Cited

U.S. PATENT DOCUMENTS

| | | | |
|---|---|---|---|
| 9,460,354 B2 | 10/2016 | Fernandez et al. | |
| 2006/0153459 A1* | 7/2006 | Zhang | G06K 9/3241 382/224 |
| 2013/0022288 A1* | 1/2013 | Sartor | G06T 5/002 382/266 |

FOREIGN PATENT DOCUMENTS

| | | |
|---|---|---|
| DE | 102013112163 | 5/2014 |
| WO | WO 2010/064122 | 6/2010 |

OTHER PUBLICATIONS

Elharar, Titled: A Hybrid Compression Method for Integral Images Using Discrete Wavelet Transform and Discrete Cosine Transform, Sep. 2007, IEEE (Year: 2007).*

(Continued)

*Primary Examiner* — Alex Kok S Liew
(74) *Attorney, Agent, or Firm* — W. F. Fasse

(57) ABSTRACT

A method of recognizing edges in a camera image (A) produced by a camera, includes steps of: assigning (S1) a respective scaling size to each pixel (aij) of the camera image (A) as a function of an object distance, relative to the camera, of a spatial region imaged in the respective pixel (aij); producing (S2) an integral image (B) from the camera image (A); applying (S3) Haar wavelet transforms to the pixels (bij) of the integral image (B) to generate a gradient image (C), wherein a scaling of the Haar wavelets is determined for each pixel (bij) of the integral image (B) taking account of the scaling size assigned to the corresponding pixel (aij) of the camera image (A); and recognizing (S4) edges in the camera image (A) using the generated gradient image (C).

20 Claims, 4 Drawing Sheets

(51) Int. Cl.
G06T 7/11 (2017.01)
G06T 3/40 (2006.01)

(56) References Cited

OTHER PUBLICATIONS

Zuo, Titled: Real-time Facial Feature Extraction Using Statistical Shape Model and Haar-Wavelet Based Feature Search, 2004, IEEE (Year: 2004).*
German Search Report for German Patent Application No. 10 2017 209 700.0, dated Apr. 27, 2018, 7 pages, Muenchen, Germany, with partial English translation, 5 pages.
Lei Zhang et al., "Edge Detection by Scale Multiplication in Wavelet Domain", Pattern Recognition Letters 23, 2002, pp. 1771 to 1784.

* cited by examiner

METHOD AND APPARATUS FOR RECOGNIZING EDGES IN A CAMERA IMAGE, AND VEHICLE

FIELD OF THE INVENTION

The invention relates to a method and an apparatus for recognizing edges in a camera image produced by means of a camera. The invention further relates to a vehicle having an apparatus for recognizing edges.

BACKGROUND INFORMATION

Precise edge recognition for detecting objects is very important commercially, particularly in industrial applications and during the autonomous control of vehicles. The basic goal of object recognition is to distinguish the object to be detected from the background. A fundamental problem here is recognizing edges, i.e. transitions between a region which still belongs to the object and a region which can already be allocated to the background or other objects.

The edges or respectively transitions between various objects distinguish themselves by different optical features on various sides of the edges, whether these are different shades, gray-scale values or levels of brightness. In order to recognize edges, gradients can therefore be calculated, wherein the difference of the color values or gray-scale values of the neighboring pixels is calculated, for example for each pixel. If the surroundings of the examined pixel are substantially homogeneous, the gray-scale values or respectively color values will largely cancel each other out and the resulting calculated difference assumes a small value. Conversely, this difference is greater if the gray-scale values or color values of the neighboring pixels on different sides of the pixel to be examined differ more significantly. In this case, the difference will assume a higher value. One edge detection filter which implements such a difference method is the Sobel operator.

Edge detection is of particular relevance in the case of driving assistance systems, for example for recognizing lane markings. An additional difficulty arises from the perspective imaging of the region captured with a vehicle camera. Since sections of the lane markings, which are further away from the camera, are imaged smaller than sections which are located closer, various spatial regions are weighted with differing levels of significance during the application of the same filter to the entire camera image. One solution to this problem can consist of creating a so-called image pyramid. Here, the resolution of the original camera image is gradually reduced at various levels. In order to evaluate edges which are located in the vicinity of the camera, higher pyramid levels with a lower resolution can be examined. Conversely, lower pyramid levels having a higher resolution are examined in order to detect edges which are located further away. By making a suitable selection of the pyramid levels, the spatial dimensions of the spatial regions corresponding to the pixels are then similar, but not identical. A factor 2 is usually selected for the resolution ratio of two neighboring pyramid levels. In this case, the available resolution deviates from the ideal resolution by up to the root of 2.

However, additional computational power is required in order to produce the pyramids. Additionally, the reduction of the resolution is also associated with a loss of information and, therefore, lower localization and recognition precision.

SUMMARY OF THE INVENTION

In view of the above, it is an object of at least one embodiment of the present invention to make possible more precise edge detection.

This object can be achieved by a method for recognizing edges having the inventive features set forth herein, an apparatus for recognizing edges having the inventive features set forth herein, and a vehicle having the inventive features set forth herein.

Further preferred embodiments are the subject matter of the subordinate claims.

According to a first aspect, the present invention accordingly provides a method for recognizing edges in a camera image produced by means of a camera. Firstly, a respective scaling size is assigned to each pixel of the camera image as a function of object distances of a spatial region imaged in the pixel with respect to the camera. An integral image is produced from the camera image. The pixels of the integral image are further transformed in order to generate a gradient image by means of Haar wavelet transforms. Here, a scaling of the Haar wavelets is determined for each pixel of the integral image, which is to be transformed, taking account of the scaling size allocated to the corresponding pixel of the camera image.

According to a second aspect, the present invention provides an apparatus for recognizing edges in a camera image produced by means of a camera. The apparatus is configured to allocate a respective scaling size to each pixel of the camera image as a function of object distances of a spatial region configured in the pixel with respect to the camera. The apparatus is further configured to produce an integral image from the camera image and to apply Haar wavelet transforms to the pixels of the integral image in order to generate gradient images. A scaling of the Haar wavelets is determined for each pixel of the integral image, which is to be transformed, taking account of the scaling size allocated to the corresponding pixel of the camera image. The apparatus recognizes edges in the camera image using the gradient image.

According to a third aspect, the invention relates to a vehicle having a vehicle camera device which is configured to produce a camera image of the surroundings of the vehicle. The vehicle further comprises an apparatus which is configured to recognize edges in the produced camera image.

The invention makes it possible to recognize edges, without the resolution having to be reduced for this. Rather, edge recognition is performed based on the information of the original image, so that losses of quality in both the localization and the recognition precision can be avoided. Nevertheless, the invention makes it possible to consider different imaging scales in various regions of the camera image. To this end, the scaling of the Haar wavelet is preferably selected in each case in such a manner that a width of the kernel of the Haar wavelet transform is in a fixed ratio to a spatial dimension of the spatial region imaged in the pixel. Pixels which image spatial regions which are further away with a greater object distance are transformed with a Haar wavelet transform with a smaller width than pixels which image spatial regions located closer to the camera. The width of the kernel, i.e. the scaling, is preferably proportional to the spatial dimension of the imaged spatial region. This guarantees a uniform evaluation of the spatial regions. The invention consequently makes possible edge detection with a high localization precision. The more accurate localization is generally advantageous in applications in which the edges are further processed. Moreover, the more accurate localization can result in a decrease in recognition errors, that means less false alarms or defective recognition.

The use of Haar wavelets additionally makes possible a pixel-precise scaling of the filter, wherein the Haar wavelets can be calculated independently of the scaling over a constant running time.

The use of Haar wavelets makes it possible to model or respectively calculate the same filter kernels as during the Sobel filtering. Alternatively, simpler filters can also be used, for example only a horizontal and vertical Haar wavelet. The invention consequently makes possible both a high precision in the scaling of the filters and in the localization of the edges.

According to a preferred further development of the method, a plurality of gradient images is generated in accordance with the above method. The scaling of the Haar wavelets additionally depends on a global scaling factor which is determined differently for each gradient image of the plurality of gradient images. On the one hand, the magnification ratios are considered by taking account of the scaling size assigned to the corresponding pixel. On the other hand, the respective spatial regions can be resolved to differing levels by a plurality of gradient images. When using Haar wavelets having smaller scalings, i.e. smaller widths of the kernels used, the respective edges are detected in smaller spatial regions, i.e. spatial regions having smaller spatial dimensions.

Based on the plurality of gradient images, the homogeneity of the adjacent surfaces can additionally be judged at a location in the image by comparing the respective gradients. Since different scales for edge recognition are considered in different gradient images, a high homogeneity can be recognized if the gradients of different scaling are substantially the same. Conversely, in the case of larger deviations of the gradients, it is recognized that the adjacent surfaces have a low homogeneity, i.e. for example the gray-scale values or color values alter significantly as the distance from the edge increases.

The homogeneity can additionally be enlisted for recognizing objects or edges. For example, lane markings have a substantially homogeneous gray-scale value or respectively color value over the entire width of the marking. Likewise, the lane is usually substantially homogeneous in a region adjacent to the lane markings. Consequently, a lane marking is only to be recognized if it is recognized that the adjacent surfaces are homogeneous. As a result, the homogeneity of the regions adjacent to the edge can be considered during the edge detection. The static can be considerably suppressed and, as a result, the method has a lower number of incorrect identifications.

According to a further development, the global scaling factors differ by predefined factors. For example, the scaling factors can differ by factors or powers of 2.

According to a further development of the method, a homogeneity of the spatial regions adjacent to the edge is established based on the plurality of gradient images. In particular, a corresponding gradient strength around the recognized edge can be determined for each of the plurality of gradient images and the homogeneity can be established, taking account of the gradient strengths. If the gradient strengths are similar, it can then be recognized that a large homogeneity exists. One method for determining the homogeneity value is the calculation of the covariance of the answers to the differently scaled Haar wavelet gradient filters of a pixel. Alternatively, the independent variances can be determined in the X and Y directions. These variances can, for example, be standardized with the sum of the averaged gradient since these, as expected, increase proportionally to the intensity. By means of an assumed normal distribution of the variances, a quality measurement of the homogeneity can be derived. Moreover, the resulting edge value can be statistically established with the assistance of all of the scalings. A preferred further development during the establishment of the resulting edge value is the utilization of weightings of the gradients based on their vulnerability to failures. Finally, the resulting edge value can be approximately multiplied by the quality, in order to fade out those edges having a poor homogeneity quality.

According to a further embodiment, in order to assess whether the gradient strengths are similar, the question of whether the gradient strengths are the same, deviate from one another by a predefined percentage or, on taking account of a predefined distribution, for instance a normal distribution, are located in predefined percentiles or quantiles, is preferably enlisted as a criterion.

According to a preferred further development of the method, a scaling of the Haar wavelets is selected in such a manner that a dimension of a spatial region considered during the Haar wavelet transform is smaller than a predefined value. The predefined value can, for example, be the width or a percentage of the width of an object to be recognized, for example a lane marking to be recognized. This prevents the unwanted scenario of a further edge being considered during the Haar wavelet transform, as a result of which the results can be falsified.

According to a preferred further development of the method, the camera image is captured by a vehicle camera, wherein lane markings are recognized by the recognition of edges.

According to a further development of the method, the camera image is a grayscale image or a color image.

The object distances of the spatial regions imaged in the pixels of the camera image are preferably estimated based on the alignment of the camera relative to the ground. Consequently, the object distances do not have to be measured. Rather, assuming that the ground is substantially planar, the respective distance of the spatial region imaged in a pixel can already be deduced, for example, from trigonometric deliberations or empirical measurements. A corresponding object distance can be allocated to each pixel or pixel region in a table, wherein the table is enlisted for assigning the respective scaling size. The estimate can preferably be performed based on properties of the camera, for example the focal length.

According to a further development of the apparatus, the latter is configured to produce a plurality of gradient images, wherein the scaling of the Haar wavelets additionally depends on a global scaling factor which is determined differently for each of the plurality of gradient images.

According to a further development of the apparatus, the global scaling factors differ by predefined factors.

According to a further development of the apparatus, the latter is configured to establish a homogeneity of the regions adjacent to the edge based on the plurality of gradient images.

According to a further development of the apparatus, the latter is configured to determine a corresponding gradient strength around the recognized edge for each of the plurality of gradient images and to establish the homogeneity of the structures adjacent to the edge, taking account of the gradient strengths.

BRIEF DESCRIPTION OF THE DRAWINGS

The present invention will be explained in greater detail below based on the embodiment examples indicated in the schematic figures of the drawings, wherein.

DETAILED DESCRIPTION OF EXAMPLE EMBODIMENTS OF THE INVENTION

If sensible, the described configurations and further developments can be combined with each other at will. Further possible configurations, further developments and implementations of the invention also comprise combinations of features of the invention, which are described above or below with regard to the embodiment examples but which are not explicitly indicated.

The aim of the appended drawings is to convey a further understanding of the embodiments of the invention. They illustrate embodiments and, in connection with the description, serve to explain principles and concepts of the invention. Other embodiments and many of the indicated advantages are set out with respect to the drawings.

Figure 1:
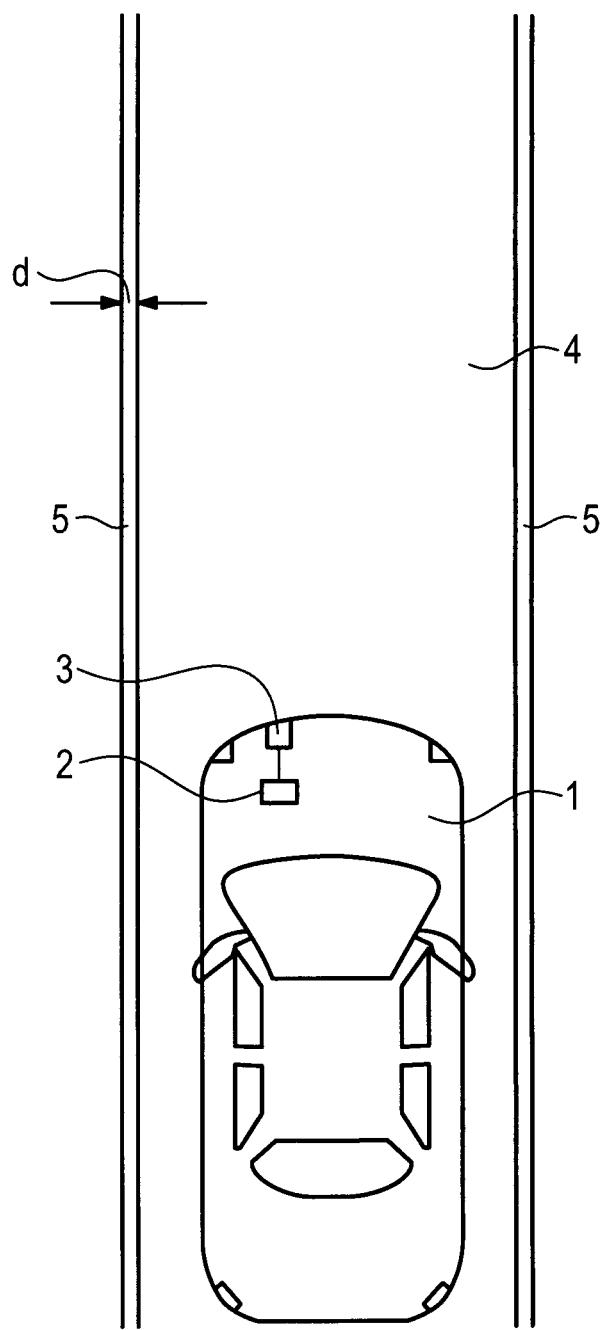
FIG. 1 shows a schematic top view of a vehicle having an apparatus for recognizing edges according to one embodiment of the invention.

A top view of a vehicle 1 having an apparatus 2 for recognizing edges according to one embodiment of the invention is illustrated in FIG. 1. The vehicle 1 is moving on a lane 4 with right and left lane markings or respectively traffic lane markings 5 respectively having a fixed width d. The vehicle 1 further has a vehicle camera device 3 which comprises a vehicle camera or preferably a plurality of vehicle cameras and is designed to acquire a camera image of an environment of the vehicle 1, i.e. in particular of the lane 4 and the lane markings 5.

Figure 2:
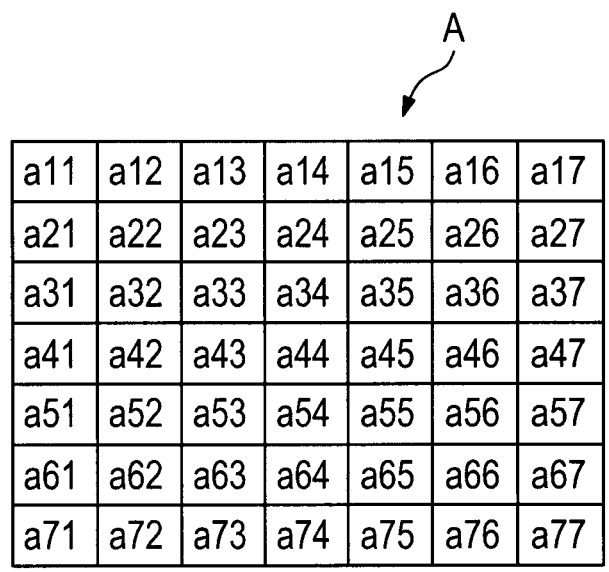
FIG. 2 shows a camera image having a plurality of pixels.

As illustrated in FIG. 2, the acquired camera image A has a plurality of pixels aij, wherein values are allocated to the pixels, for example gray-scale values or color values.

The apparatus 2 comprises a computing device, for instance a microprocessor which is designed to allocate a respective scaling size to each pixel aij of the camera image A. The scaling size can correspond to a surface area or another spatial dimension, for instance a width or a circumference of a spatial region imaged in the pixel aij.

Figure 3:
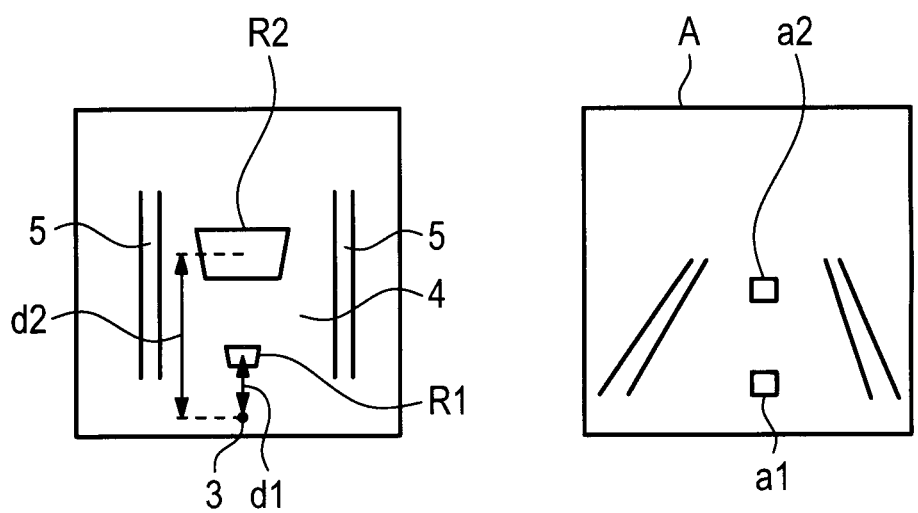
FIG. 3 shows a schematic top view of a road in order to explain the object distances and a corresponding camera image of the road.

In FIG. 3, a top view of the road scene illustrated in FIG. 1 is depicted again on the left side, by way of example, wherein a first spatial region R1 and a second spatial region R2 are marked. The spatial regions R1, R2 respectively have a first object distance d1 and a second object distance d2 from the camera 3. The object distance corresponds to a spatial distance between the camera device 3 and the respective spatial region R1, R2 and, in the case of larger spatial regions, preferably to a center of the spatial region.

The camera image A which is produced by the camera 3 is illustrated on the right side of FIG. 3. A first pixel a1 images the first spatial region R1 and a second pixel a2 images the second spatial region R2. Due to the perspective imaging, the further away, second spatial region R2 imaged in the second pixel a2 is larger, e.g. has a greater surface area than the first spatial region R1 located closer to the camera 3 imaged in the first pixel a1. The different size of the spatial regions R1, R2, i.e. for example the surface area or the width of the spatial regions R1, R2, for a planar lane 4, substantially only depends on the distance d1, d2 of the spatial regions R1, R2 from the camera 3 and the orientation of the camera 3 relative to the lane 4. Since, in the case of a fixed orientation of the camera 3, a spatial region imaged in a specific pixel aij constantly has spatial dimensions which are substantially the same size, the apparatus 2 can therefore allocate a respective scaling size, which corresponds to the size of the respective imaged spatial region, to each respective one of the pixels aij in each case. The allocation can, in particular, be fixedly predefined and stored in a memory of the apparatus 2.

Figure 4:
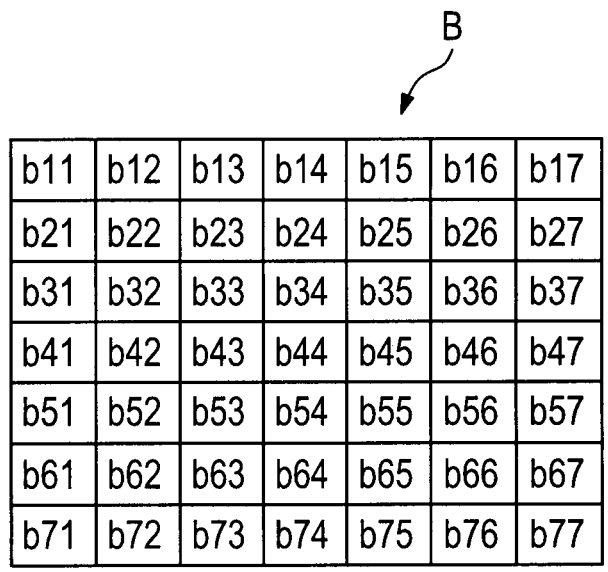
FIG. 4 shows an integral image having a plurality of pixels.

The apparatus 2 produces an integral image B having pixels bij, which is illustrated in FIG. 4, from the camera image A. Consequently, the sum of all of the pixels aij of the camera image A between the position of the pixel axy of the camera image A corresponding to a particular pixel bxy of the integral image B and the position of the origin, for example the upper left corner of the camera image A, is allocated respectively to each respective particular pixel bij of the integral image B. The use of integral images allows pixel sums to be calculated more simply.

Figure 5:
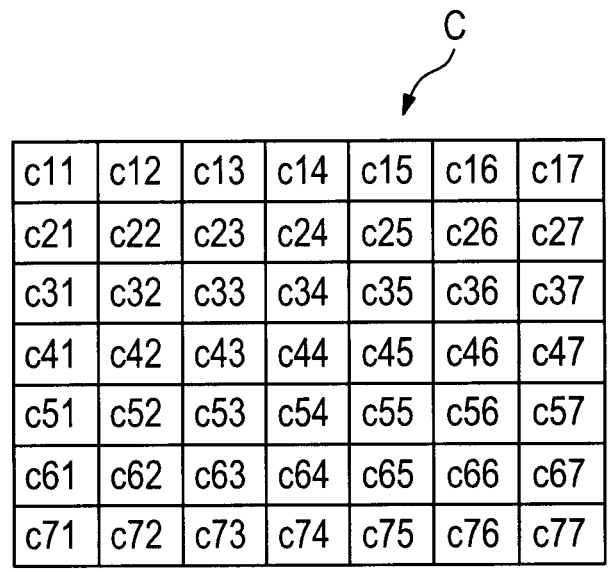
FIG. 5 shows a gradient image having a plurality of pixels.

A gradient image C with pixels cij, which is illustrated in FIG. 5, is further generated from the integral image B. In order to produce a pixel cij of the gradient image C, a Haar wavelet transform is applied to the integral image B, wherein one or more kernels of the Haar wavelet transform are selected in such a manner so that during the Haar wavelet transform the pixel bij of the integral image B corresponding to the pixel cij of the gradient image C as well as, if necessary, neighboring pixels bij of the integral image B are considered. The number of the considered pixels bij depends on the scaling of the Haar wavelets used, i.e. the width and height. The width and height of a wavelet designate a region, in which the kernel assumes a value different from zero. The pixel cij is vectorial if multiple kernels are used. Two kernels, which respectively calculate the edge strength along one of the two image coordinate axes, are preferably used.

The apparatus 2 selects this scaling for each pixel bij of the integral image B, which is to be transformed, taking account of the scaling size allocated to the corresponding pixel aij of the camera image A. For example, the scaling can be indirectly proportional to the size of the imaged spatial region, that is to say to the scaling size of the corresponding pixel aij of the camera image A. That means, in order to calculate each pixel cij of the gradient image C, pixels bij of the integral image B are considered, wherein a spatial region of a similar size corresponds to the corresponding pixels aij of the camera image A in each case.

Figure 6:
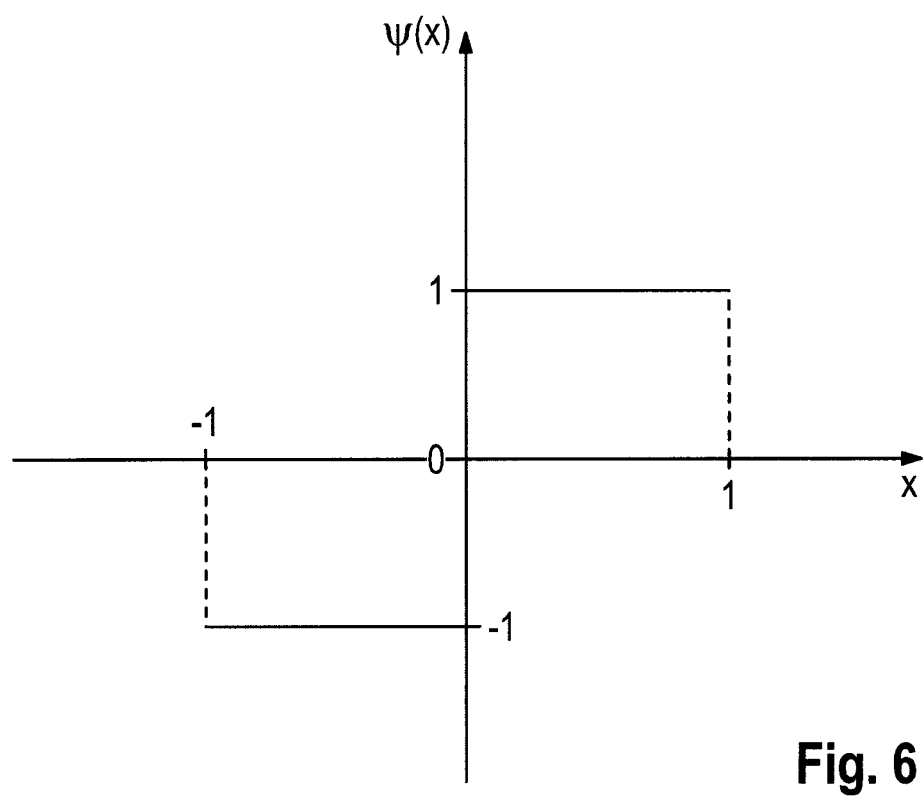
FIG. 6 shows an exemplary illustration of a Haar wavelet.

FIG. 6 depicts an exemplary Haar wavelet function $\psi(X)$ which has the value 1 for $0 < X \le 1$, and the value $-1$ for $-1 \le X < 0$, and the value 0 for $X < -1$ and for $X > 1$. Alternatively, another example of a Haar wavelet function (not illustrated) could have the value 1 for X between 0 and ½, the value minus 1 for X between ½ and 1, and the value zero for all other values of X. By means of convolution of the Haar wavelet with the values of the pixels bij of the integral image B, the respective corresponding value of the corresponding pixel cij of the gradient image C is produced. Accordingly, a product of Haar wavelets illustrated in FIG. 6 can be applied to two-dimensional images. In addition, the invention is not limited to the imaged Haar wavelet, but can also be applied to any other Haar wavelets.

The values of the pixels bij of the integral image B are viewed as two-dimensional step functions. The change in the scaling of the Haar wavelet then alters the respective range of values, which is also allowed for on convolution with the Haar wavelet.

Haar wavelets are suitable for edge recognition because a gradient is substantially calculated by the Haar wavelet transform. If the edge is located at ½, the value of the pixel bij of the integral image B to the left of the edge is different from the value of the pixel bij of the integral image B to the right of the edge, so that the Haar wavelet transform produces a value which is not equal to 0. By changing the scaling of the Haar wavelet, the carrier of the kernel of the Haar wavelet, i.e. that region in which the Haar wavelet assumes a value different from 0, is modified. As a result, particularly the number of the pixels bij of the integral image B taken into consideration is varied. The scaling is preferably selected in such a manner so that the spatial width of the spatial region imaged in the corresponding pixels aij is smaller than a predefined threshold, for example smaller than a typical width of lane markings. This prevents both a region to the left of a lane marking and a region to the right of a lane marking also being taken up in the calculation during the transform. Consequently, only a single edge is evaluated and a scenario in which two edges are evaluated simultaneously, which would result in a deterioration of the results, is prevented.

The scaling is preferably derived from the expected structure sizes which are, in turn, determined by a model of the surroundings. For example, the size and the arrangements of lane markings can be predefined based on a road model.

The apparatus 2 is preferably configured to produce a plurality of gradient images C in accordance with the steps described above. The scaling of the Haar wavelets preferably additionally depends on a global scaling factor. The global scaling factor for a first gradient image C is selected in such a manner that, as described above, the pixels aij of the camera image, which correspond to the pixels bij of the integral image B considered for the Haar wavelet transform, image a spatial region which has a smaller diameter than a predefined value such as, for instance, the typical width of a lane marking. In order to produce a second gradient image C, the scaling is preferably halved so that spatial regions which are merely half as big are considered. The scaling is rounded to an integral value for application. If the scaling is rounded to 0, the pixel is skipped and no result is produced. The scaling is gradually further decreased by factors of 2 for each subsequent gradient image. Consequently, the gradient images C consider spatial regions of various sizes.

The apparatus 2 is then designed, based on the gradient image C or based on the plurality of gradient images C, to recognize an edge in the camera image A. Edges are recognized at pixel positions, in which the values of the pixels cij of the gradient image C are greater than a predefined value.

In a plurality of gradient images C, the apparatus 2 can further recognize whether an edge is recognized for each of the gradient images C. If this is the case, the apparatus 2 then calculates corresponding gradient strengths, for example a value averaged over a plurality of pixels cij of the gradient image C located in the vicinity of the edge, for each of the gradient images C. The apparatus 2 further compares the established gradient strengths. For example, the apparatus 2 can calculate a distribution of the gradient strengths and establish whether the gradient strengths are, in each case, distributed in a predefined region around an expected value. In this case, the apparatus 2 recognizes that the regions adjacent to the edge are homogeneous. A measure of the homogeneity of the regions adjacent to the edge can be calculated by the apparatus 2, for example based on the distribution of the gradient strengths.

Figure 7:
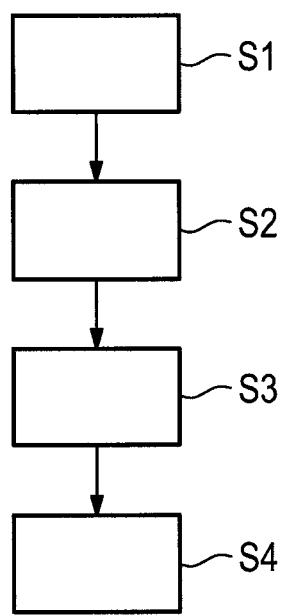
FIG. 7 shows a flow chart of a method for recognizing edges in a camera image.

A flow chart of a method for recognizing edges in a camera image A produced by means of a camera is illustrated in FIG. 7. The camera image A can preferably be acquired by means of a camera of a vehicle. In particular, the method can be configured to recognize lane markings.

In a method step S1, a respective scaling size is allocated to each pixel aij of the camera image A, which scaling size depends on object distances of a spatial region imaged in the pixel aij. The scaling size can, as described above, quantify a size of the imaged spatial region. For example, the scaling size can be proportional to a surface area, a diameter or a circumference of the imaged spatial region.

In a further method step S2, an integral image B is calculated from the camera image A.

In a method step S3, the pixels bij of the produced integral image B are transformed by means of a Haar wavelet transform and corresponding pixel cijs of a gradient image C are consequently produced or respectively generated. The number of the pixels bij considered during the Haar wavelet transform depends on the scaling size of the corresponding pixel aij of the camera image A, which is located at the same pixel position, for each pixel bij of the integral image B, which is to be transformed. The scaling is selected in such a manner that spatial regions which are substantially the same size are considered for each Haar wavelet transform.

In a method step S4, the corresponding gradient image C is then evaluated in order to recognize edges.

REFERENCE NUMERALS

1 Vehicle
2 Apparatus
3 Camera device
4 Lane
5 Lane marking
A Camera image
aij Pixel of the camera image
B Integral image
bij Pixel of the integral image
C Gradient image
cij Pixel of the gradient image

The invention claimed is:
1. A method of recognizing edges in a camera image of an environment scene, wherein the camera image has plural pixels and has been produced by a camera, the method comprising the steps:
assigning a respective scaling size to each respective pixel of the camera image as a function of an object distance, relative to the camera, of a spatial region of the environment scene imaged in the respective pixel of the camera image;
producing an integral image from the pixels of the camera image;
applying Haar wavelet transforms to pixels of the integral image to generate a gradient image, wherein a respective scaling of Haar wavelets applied in the Haar wavelet transforms is determined for each respective pixel of the integral image dependent on the respective scaling size assigned to the respective pixel of the camera image that corresponds to the respective pixel of the integral image; and recognizing edges in the camera image using the gradient image.

2. The method according to claim 1, wherein a plurality of the gradient images is generated, wherein the respective scaling of the Haar wavelets applied in the Haar wavelet transforms to generate the plurality of the gradient images additionally depends on a respective global scaling factor which is determined differently for each of the plurality of gradient images.

3. The method according to claim 2, wherein the global scaling factors differ from one another by predefined factors.

4. The method according to claim 2, wherein a homogeneity of regions adjacent to the edges is determined based on the plurality of gradient images.

5. The method according to claim 4, wherein a respective corresponding gradient strength around the edges is determined respectively for each of the plurality of gradient images, and the homogeneity is determined taking account of the gradient strengths.

6. The method according to claim 1, wherein the respective scaling of the Haar wavelets is selected so that a dimension of the respective spatial region imaged in the respective pixel of the camera image that corresponds to the respective pixel of the integral image for which the respective scaling is determined during the Haar wavelet transforms is smaller than a predefined value.

7. The method according to claim 1, wherein the object distances of the spatial regions imaged in the pixels of the camera image are estimated based on an alignment of the camera relative to a ground.

8. An apparatus, including a microprocessor, for recognizing edges in a camera image of an environment scene, wherein the camera image has plural pixels and has been produced by a camera, wherein the apparatus is configured:
to assign a respective scaling size to each respective pixel of the camera image as a function of an object distance, relative to the camera, of a spatial region of the environment scene imaged in the respective pixel of the camera image;
to produce an integral image from the pixels of the camera image;
to apply Haar wavelet transforms to pixels of the integral image to generate a gradient image, wherein a respective scaling of Haar wavelets applied in the Haar wavelet transforms is determined for each respective pixel of the integral image dependent on the respective scaling size assigned to the respective pixel of the camera image that corresponds to the respective pixel of the integral image; and
to recognize edges in the camera image using the generated gradient image.

9. The apparatus according to claim 8, which is further configured to generate a plurality of the gradient images, wherein the respective scaling of the Haar wavelets applied in the Haar wavelet transforms to generate the plurality of the gradient images additionally depends on a respective global scaling factor which is determined differently for each of the plurality of gradient images.

10. The apparatus according to claim 9, wherein the global scaling factors differ from one another by predefined factors.

11. The apparatus according to claim 9, which is further configured to determine a homogeneity of regions adjacent to the edges based on the plurality of gradient images.

12. The apparatus according to claim 11, which is further configured to determine a respective corresponding gradient strength around the edges respectively for each of the plurality of gradient images, and to determine the homogeneity taking account of the gradient strengths.

13. A vehicle comprising the apparatus according to claim 8 in combination with a vehicle body, and a vehicle camera device including the camera configured to produce the camera image of the environment scene of surroundings of the vehicle, wherein the apparatus is configured to recognize the edges in the camera image.

14. The method according to claim 1, wherein the step of producing the integral image comprises determining each respective one of the pixels of the integral image as a respective sum of all of the pixels of the camera image between a position of an origin point of the camera image and a position of a respective one of the pixels of the camera image corresponding to the respective pixel of the integral image.

15. The method according to claim 1, wherein the gradient image comprises gradient image pixels, and the step of recognizing edges in the camera image using the gradient image comprises identifying that the edges exist in the camera image at locations corresponding to the gradient image pixels of which respective values are greater than a predefined threshold value.

16. The method according to claim 4, wherein the step of recognizing the edges in the camera image using the gradient image comprises identifying the edges only in those of the pixels of the camera image for which the respective homogeneity determined for the regions adjacent to those pixels is higher than a threshold homogeneity.

17. The method according to claim 6, wherein the dimension of the respective spatial region is a surface area, a width, a diameter or a circumference of the respective spatial region.

18. The method according to claim 6, wherein the predefined value is less than a dimension of a pertinent physical feature to be recognized in the camera image based on the recognizing of the edges.

19. The method according to claim 1, further comprising an initial step of producing the camera image of the environment scene with the camera.

20. The method according to claim 19, wherein the camera is a vehicle camera, and wherein the recognizing of the edges in the camera image involves recognizing lane markings on a road in the environment scene.

\* \* \* \* \*